United States Patent

[11] 3,564,975

| [72] | Inventor | James H. Moran<br>Saginaw, Mich. |
|---|---|---|
| [21] | Appl. No. | 777,296 |
| [22] | Filed | Nov. 20, 1968 |
| [45] | Patented | Feb. 23, 1971 |
| [73] | Assignee | General Motors Corporation<br>Detroit, Mich. |

[54] POWER STEERING GEAR
3 Claims, 1 Drawing Fig.

[52] U.S. Cl................................................ 91/442,
60/52, 91/444, 91/450, 91/451
[51] Int. Cl.......................................F15b 11/08,
F15b 13/04
[50] Field of Search............................91/375 (A),
442, 444, 450, 451, 407; 180/79.2 (Cursory),
(Inquired); 60/525

[56] References Cited
UNITED STATES PATENTS
1,304,286  5/1919  Emden.......................... 91/442X

| 2,900,960 | 8/1959 | Gratzmuller................. | 91/451X |
| 3,022,772 | 2/1962 | Zeigler et al................. | 91/380X |
| 3,136,226 | 6/1964 | Gratzmuller................. | 91/442 |

*Primary Examiner*—Martin P. Schwadron
*Assistant Examiner*—Irwin C. Cohen
*Attorneys*—E. W. Christen, H. Furman and D. L. Ellis ABSTRACT: A fluid power steering gear unit for automotive vehicles of the type generally including a double-acting fluid servomotor for assisting reduction gear mechanism of the unit in turning the vehicle dirigible wheels and controlled by a four-way valve for selectively pressurizing either side of the servomotor piston while communicating the other side thereof to fluid sump, is further provided with a bleed valve and a slave valve for assisting the control valve in quickly relieving the pressurized side of the servomotor of pressure fluid upon completion of the desired fluid assist to thereby permit the quick return of the steering gear unit from any power actuated offcenter position back to its neutral or centered condition.

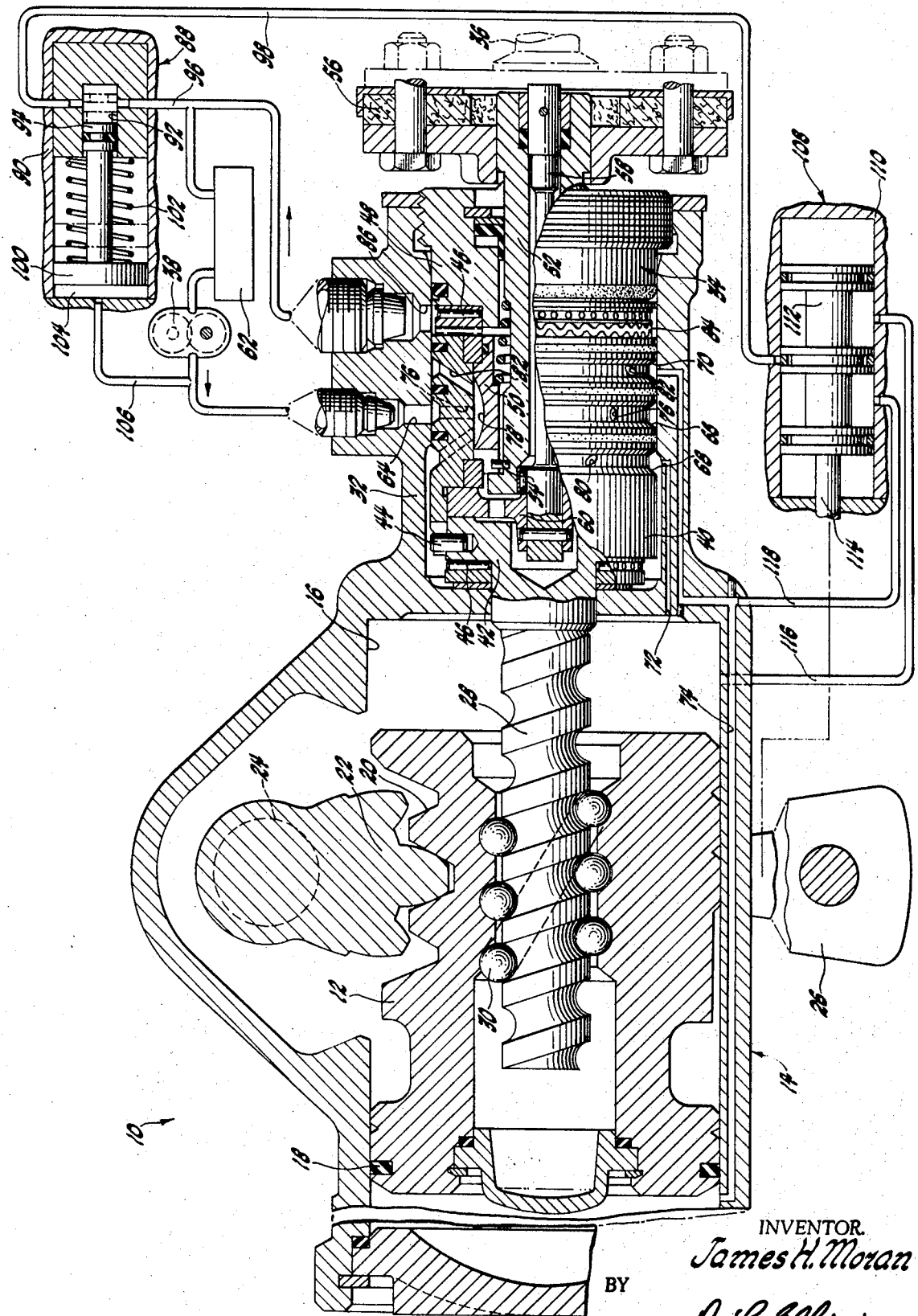

POWER STEERING GEAR

This invention relates to vehicle steering gear and more particularly to an improved hydraulic power steering gear for automotive vehicles.

The primary feature of this invention is that it provides a power steering gear for automotive vehicles and of the type including a power assist fluid motor and a control valve connected with a fluid pressure source for selectively pressurizing the motor and wherein there is further included returnability bleed circuit means for assisting the control valve in obtaining quick relief in the servomotor of pressurized fluid after a turn of the vehicle dirigible wheels has been negotiated.

A further feature of the invention resides in the provision in such returnability bleed circuit means of a pilot operated bleed valve controlling a fluid bleed line connecting the servomotor and the system fluid sump independently of the control valve and which is responsive to actuation of the control valve, for power steering of the vehicle to close the bleed circuit but which is opened for bleed of the servomotor immediately that the control valve is allowed to return to nonactuated or neutral condition following the negotiation of the vehicle turn.

Yet another feature of this invention resides in the provision in a double-acting power steering servomotor having such returnability bleed circuit means of a position-sensitive slave valve connected with the steering gear mechanism of the power steering unit to select the pressurized one of the two fluid chambers of the servomotor utilized in making the vehicle turn and connect it into the bleed circuit for enhanced bleeding of the servomotor to the fluid sump.

These and other features and advantages of the invention will be readily apparent from the following description and from the drawings wherein the single FIG. shows a partially broken away sectional and partially schematic view of a fluid operated power steering gear unit for automotive vehicles including returnability bleed circuit means according to the invention.

The fluid power steering gear unit, designated generally as 10, is shown in an illustrative embodiment as being of the so-called integral inline type including a fluid operated power assist portion constructed coaxially within the reduction gear mechanism of the steering gear unit and controlled by a further coaxially arranged four-way control valve portion.

More specifically, the combined power assist and reduction gear mechanism of gear unit 10 includes a ball nut-piston 12 mounted reciprocably within a cylinder 16 formed in the steering gear housing 14 and sealed to such cylinder as at 18 to define at opposite sides of the seal a pair of fluid pressure assist chambers. Formed on one side of the ball nut-piston 12 is a set of rack teeth 20 meshingly engaged with a toothed gear sector 22 formed on or otherwise connected with the usual pitman or output shaft of the steering gear reduction unit, such shaft being indicated at 24. The pitman shaft, as is conventional, has mounted on an exposed end thereof outside housing 14 a pitman arm, shown at 26, adapted for connection within the usual vehicle steering linkage extending to the dirigible wheels of the vehicle.

A steering input worm or screw shaft 28 extends within a central bore of the ball nut-piston 12 and has operative connection therewith through a conventional recirculating train of antifriction bearing balls 30 such that rotation of the worm in opposite directions causes reciprocation of the ball nut-piston in corresponding directions, and vice versa.

Mounted within a further portion 32 of housing 14 is the coaxially arranged control valve for the fluid power assist motor, such valve being generally designated as 34. For a complete detailed description of the structure and operation of such valve, reference may be had to the Zeigler et al. Pat. No. 3,022,772, issued Feb. 27, 1962, and assigned to the assignee of the present invention. Generally, however, valve 34 is of the type including a pair of relatively rotatable valve elements, one of which is connected for rotation as a unit with the worm 28 and the other of which is connected for unitary rotation with the usual manually operable steering shaft, indicated at 36. The valve elements are operative under relative rotation in either direction from a neutral relationship to build and apply fluid pressure from a fluid pump 38 to one or the other of the fluid chambers within cylinder 16.

More specifically, a first valve element or outer sleeve 40 is rotatably received within a central bore of housing portion 32 and has connection for unitary rotation with an enlarged end 42 of the worm 28 by a pin 44. Needle roller bearings 46 are provided at opposite ends of the valve sleeve 40 seating on the housing 14 and on an end plug 48 therein for antifriction rotation as a unit of the worm and valve sleeve. The second valve element or spool 50 is mounted suitably within the sleeve 40 for fluid sealing therewith and rotation relative thereto and has connection with the inner end of an input or stub shaft 52 as by a pin 54. The stub shaft 52 extends through a seal in the end plug 48 to exteriorly of the housing 14 for connection at its opposite end with one connector flange of a flexible steering shaft coupling 56, the other flange of which is rigidly connected with the steering shaft 36.

A torsion rod 58 is located within the hollow stub shaft 52 and has pinned connection at its opposite ends with the stub shaft and with the valve sleeve 40 through a connector 60. Torsion rod 58 provides for centering of the valve sleeve 40 and spool 50 in a centered or neutral condition and for resilient resistance to relative rotation between these two elements during power assist operation. In such neutral condition, a set of land and groove structures on the valve sleeve 40 and spool 50 are relatively located to provide for open-center flow or communication between pump 38, the two end chambers in cylinder 16 and the fluid sump or reservoir, designated 62. Output flow from pump 38 enters the control valve 34 through a pressure port 64 in housing portion 32 leading to a sealed central annular pressure groove 66 in the periphery of valve sleeve 40. Flanking groove 66 are a pair of cylinder grooves 68 and 70 each of which lead to an end chamber of cylinder 16 through respective passages 72 and 74 in housing 14. Pressure fluid entering groove 66 is communicated through a plurality of radial bores 76 in valve sleeve 40 to a like number of axially extending concave shaped grooves 78 in the outer periphery of valve spool 50. Reference may be had here to Zeigler et al., but generally, such grooves 78 cooperate with lands in valve sleeve 40 to direct pressure fluid entering groove 66 and bores 76 to either one of a set of motor ports 80 and 82 serving respectively the annular grooves 68 and 70 and the passages 72 and 74.

In the neutral or centered condition of the valve parts, pressure fluid entering groove 66 is directed substantially equally between these motor ports 80 and 82 for hydraulic balance on the ball nut-piston 12. The pressure fluid thence flows through groove 78 in spool 50 to radial bores therein, not shown, leading to a central cavity between the spool and stub shaft 52 through a wave washer 84 and an outlet port 86. Port 86 connects through a suitable conduit to reservoir 62 from which the pump 38 draws. Depending upon the direction of manual input rotation on the steering shaft 36 sought to provide manual steering effort to worm 28, stub shaft 52 and valve spool 50 will be rotated against the resilience of torsion rod 58 relative to the worm and valve sleeve 40 to move the land and groove structure of the sleeve and spool to relative positions effecting a varying degree of pressurization through one of the passages 72 or 74 to the respective side or end chamber of cylinder 16. Such variations in pressure range of course from a minimum or static pressure in the neutral relation to a maximum pressure value wherein one of the passages 72 is open to incoming pressure from groove 66 and completely closed from communication with reservoir 62, and the other of such passages 72 or 74 is completely closed from the incoming pressure fluid in groove 66 and open to the reservoir.

The pressurization experienced in the respective end chamber of cylinder 16 effects a similar forced reciprocation of ball nut-piston 12 aiding the manual turning effort applied to worm 28 through the deflected torsion rod 58 to effect rotation of sector 22, pitman arm 26 and a turning of the vehicle dirigible wheels.

In the drawing, the ball nut-piston 12 and pitman arm 26 are shown located in a centered or straightahead position of the steering gear unit 10 corresponding to the straight ahead position of the vehicle dirigible wheels. Assuming that control valve 34 has been brought into play to cause a powered turn through the gear unit 10 by pressurization of one of the end chambers of cylinder 16, it is advantageous that the pressure fluid present in such cylinder end chamber be relieved or bled as quickly as possible to assure the minimum hydraulic resistance in the fluid circuitry of the gear unit 10 against the return of the vehicle dirigible wheels, sector 22 and the ball nut-piston 12 to a straight ahead centered position shown as is normally occasioned by the conventional vehicle front end suspension geometry effects during vehicle maneuvering. Such returnability is had with maximum assurance through the use of the bleed circuit means of this invention aiding the normal provisions for returnability in control valve 34.

Such bleed circuit means include a pilot operated bleed valve designated generally as 88 having a body 90, which may be suitably integrated within housing 14 of gear unit 10, but is schematically shown herein as separate therefrom. A central bore 92 of the bleed valve body has mounted therewithin a valve spool or plunger 94 sealed to the bore 92 and reciprocable therein to function for opening and closing of fluid communication between a conduit 96, connected with the return or reservoir line from outlet port 86, and a further conduit 98.

Plunger 94 includes a piston head 100 reciprocable with the plunger in an enlarged bore of the valve body 90 and seating one end of a coil compression spring 102 seated at its other end on the valve body. A chamber 104 in the valve body communicates through a conduit 106 to the pressure fluid line between pump 38 and pressure port 64 of the gear unit 10. Thus, spring 102 may be selected in rate and stroke to provide for pilot operation of the plunger 94 to reciprocate and close conduits 96 and 98 from communication, illustrated in the broken line position, when fluid pressure reaches a predetermined level in the conduit 106, pressure port 64 and control valve 34 and to open such conduits 96 and 98 to communication at all levels of pressure in the control valve 34 below such predetermined level.

Conduit 98 leads to a slave valve 108 which again, while shown schematically as being separate from steering gear unit 10, may be integrated therewithin in a manner which will appear. The slave valve includes a valve body 110 fixed with respect to housing 14 and mounting reciprocably therein a valve spool 112 carrying a set of three lands sealed to the wall of the valve body bore. The spool is connected through a shaft 114 or similar structure to the pitman arm 26. As shown in the drawing, the spool 112 is located with the pitman arm in the centered or straight ahead position of the steering gear unit such that the central land of the spool blocks flow to or from conduit 98. At either side of this central land, a pair of conduits 116 and 118 from the bore of the valve body 110 lead respectively to the end chamber of cylinder 16 served by the passage 72 and to the passage 74 serving the other end chamber.

Under movement of ball nut-piston 12 leftwardly from centered position, as for example during a powered left turn of the vehicle dirigible wheels, valve spool 112 is carried leftwardly with pitman arm 26 to open conduit 116 to communication with conduit 98. During an opposite turn or rightward movement of the ball nut-piston, passage 74 and conduit 118 are opened to communication with the conduit 116. Thus, it is seen that under movement of the steering gear unit 10 by fluid pressure in either a left or right turn mode from the substantially straight ahead position shown, the pressurized chamber is adapted to be communicated through the slave valve 108 to the bleed valve 88 and thence to the reservoir 62.

However, to prevent an unwanted loss of fluid pressure assist in making the powered turn of the dirigible wheels in either direction, the bleed valve 88 is held in a closed broken line position until power assist fluid pressure set up by the control valve 34 is at or below a predetermined maximum pressure. For purposes of illustration, such predetermined maximum pressure may be set at or near the static system pressure experienced in control valve 34 in open-center neutral condition with the pump 38 operating at nearly full open throttle speed of the engine. It is thus assured that the bleed valve will not open either of the servomotor end chambers to the reservoir externally of the control valve while such control valve is being utilized for a power assisted turn.

Accordingly, assuming a right turn brought about by fluid pressure assistance from actuation of control valve 34 to move the ball nut-piston 12 rightwardly from the centered position shown, the valve spool 112 is carried rightwardly to open conduit 118 and its associated cylinder end chamber causing the rightward movement of the ball nut-piston to the conduit 98 and thence to the plunger bore of the bleed valve body 90. Once the system pressure in the line between pump 38 and the control valve 34 has been relieved by release of manual steering effort to effectively a zero manual input torque on the steering shaft 36, as is the case when the desired vehicle turn has been accomplished, the pressure in chamber 104 is accordingly reduced to the predetermined level whereat the spring 102 returns the plunger toward the solid line position shown allowing for a path of exhaust from the cylinder end chamber conduit 118 through the bleed valve to the reservoir 62. The conditions of slave valve 108 and bleed valve 88 obtaining in relief of a pressure assisted left turn in the gear unit is believed apparent from the foregoing.

As indicated above, the bleed valve 88 may be structurally integrated within housing 14, particularly portion 32 thereof by suitable fluid connections such as with the control valve 34 shown schematically in the drawing. Further, the slave valve 108 may be similarly integrated in the housing and including, for example, structural connection between ball nut-piston 12 and a slave valve spool mounted reciprocably in a valve bore in housing portion 32.

I claim:

1. In fluid power steering apparatus for an automotive vehicle having steering gear mechanism for selectively turning the vehicle dirigible wheels in opposite directions from a centered condition to either of two extreme turn positions, the combination comprising, a double acting fluid motor, means connecting said motor with said steering gear mechanism, a source of pressurized fluid, a fluid sump, four-way control valve means, passage means connecting said control valve means between the two sides of said motor, said source and said sump and actuable from a neutral substantially nonpressurizing condition to effect varying degrees of pressurization on a selected side of said motor by said source while connecting the other side thereof with said sump, bleed valve means, conduit means connecting said bleed valve means with said sump independently of said control valve means, slave valve means, means connecting said slave valve means with said steering gear mechanism for response to movement of the latter in either direction from the centered condition thereof and having fluid connection with said bleed valve means whereby to connect a respective side of said motor with said sump through said bleed valve means in accordance with the position of the steering gear mechanism either side of said centered condition thereof, and means responsive to selected actuation of said control valve means for closing said bleed valve means against connection between said motor and said sump when said control valve is actuated from said neutral condition thereof and for opening said bleed valve means when said control valve means is in said neutral condition thereof.

2. In fluid power steering apparatus for an automotive vehicle having steering gear mechanism for selectively turning the vehicle dirigible wheels in opposite directions from a centered condition to either of two extreme turn positions, the combination comprising, a double acting fluid motor, means connecting said motor with said steering gear mechanism, a source of pressurized fluid, a fluid sump, four-way control valve means, passage means connecting said control valve means between the two sides of said motor, said source and said sump, and actuable to effect varying degrees of pressurization on a selected side of said motor by said source while connecting the other side thereof with said sump, a bleed valve means, conduit means connecting said bleed valve means with said sump independently of said control valve means, slave valve means including a valve member, means connecting said slave valve means with said steering gear mechanism for movement relative to a fixed valve body in response to movement of said steering gear mechanism in either direction from said centered condition thereof, said slave valve means having fluid connection through further passage means with said bleed valve means whereby to connect a respective side of said motor with said sump through said bleed valve means in accordance with the position of the steering gear mechanism either side of said centered condition thereof, and pilot means operative upon said bleed valve means and in fluid circuit between said source and said control valve means to be responsive to selected pressurizing actuation of said control valve means whereby to close said bleed valve means against connection between said motor and said sump when said control valve means are in a condition of predetermined pressurization between said source and said motor and to open said bleed valve means when said control valve means is in pressurizing conditions below said predetermined pressurizing condition.

3. In fluid power steering apparatus for an automotive vehicle having steering gear mechanism for selectively turning the vehicle dirigible wheels in opposite directions from a centered condition to either of two extreme turn positions, the combination comprising, a double acting fluid motor, means connecting said motor with said steering gear mechanism, a source of pressurized fluid, a fluid sump, a four-way open center configuration control valve means, passage means connecting said control valve means between the two sides of said motor, said source and said sump, said control valve being actuable from a low system pressure neutral condition to effect varying degrees of higher pressurization on a selected side of said motor by said source while connecting the other side thereof with said sump, a bleed valve means, conduit means connecting said bleed valve means with said sump independently of said control valve means, pilot means operative upon said bleed valve means and in fluid circuit between said source and said control valve means to be responsive to selected pressurizing actuation of said control valve means whereby to close said bleed valve means against connection between said motor and said sump when said control valve means are in a condition of predetermined pressurization between said source and said motor higher than said low system pressure of said neutral condition and to open said bleed valve means when said control valve means is in pressurizing conditions below said predetermined pressurizing condition, and means responsive to positioning of said dirigible wheels in a condition deflected either side of said centered position thereof to connect the pressure side of said servomotor corresponding to said deflected position with said bleed valve means and selectively through the latter to said sump.